Jan. 9, 1940.　　　　K. H. KRAMBEER　　　　2,186,702
METHOD OF SELECTIVE TUNING
Filed April 13, 1937
*Fig. 1*
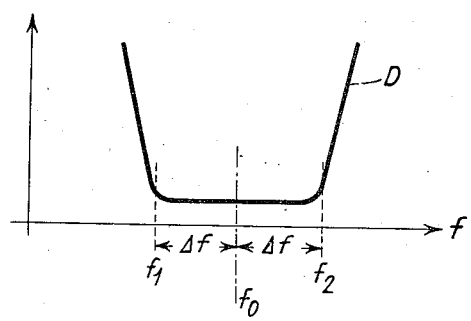
*Fig. 2*
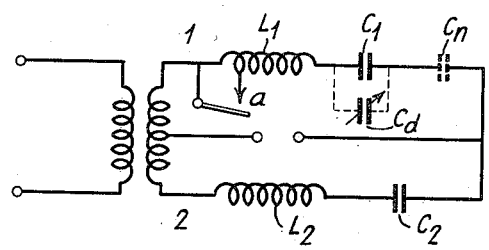
*Fig. 3*
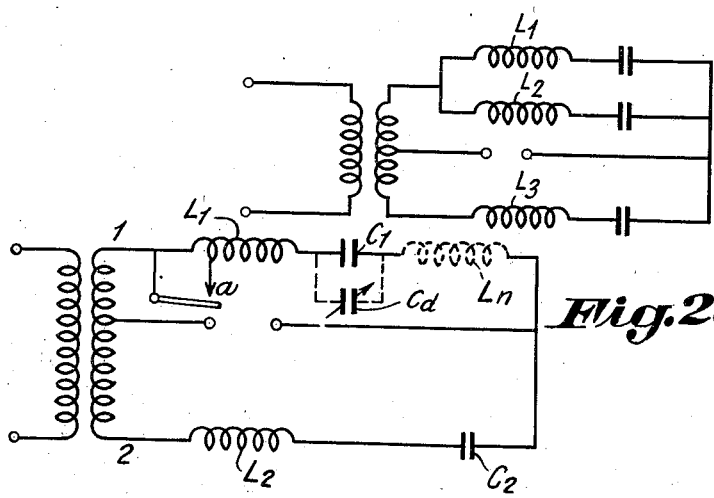
*Fig. 2a.*
INVENTOR
KARL HEINRICH KRAMBEER
BY
ATTORNEY Patented Jan. 9, 1940

2,186,702

UNITED STATES PATENT OFFICE 2,186,702

METHOD OF SELECTIVE TUNING

Karl Heinrich Krambeer, Berlin-Spandau, Germany, assignor to Siemens & Halske, Aktiengesellschaft, Siemensstadt-Berlin, Germany, a corporation of Germany Application April 13, 1937, Serial No. 136,516
In Germany April 9, 1936

4 Claims. (Cl. 178—44)

This invention relates to a new and novel method of tuning means for selectivity.

When testing means for selectivity such as are used for limiting a message band, or for filtering foreign currents in message transmission stations, it is necessary to check up the individually employed reactances and oscillatory circuits with respect to their resonance frequency. In larger institutions and laboratories, a number of measuring instruments and especially test transmitters with variable frequencies are available for this purpose so that the testing and tuning can be easily carried out.

However, this is often not possible when carrying out measurements at the line which become sometimes necessary in order to check up on the quality of the means serving for the selectivity, or in smaller testing laboratories, or in case of assembling at a distant place. In this case, there is usually only a small buzzer with a constant frequency available which, however, does not afford testing of oscillatory circuits with regard to resonance frequency if the latter deviates from the existing frequency. The present invention overcomes these drawbacks without requiring a further transmitter or transmitter whose frequency can be varied.

In accordance with the present invention, there is provided a method of tuning and/or testing of means for selection serving for limiting a message or filtering foreign currents in message transmission stations, and means being provided for bringing into accord the transmission ratio and the apparent resistance or impedance of the selection means on one hand, and the frequencies of the messages to be transmitted on the other hand while considering and taking into accord possible disturbing frequencies. This is accomplished by having at least one reactance of the circuits of the selection means and which determine the above values, varied by the switching-in or switching-off of reactance parts that with maintained latitude or range of tuning, the resonance is established with an operating frequency through subsequent tuning of the circuit following the switching operation, so that after removing the additional reactance variation, the tuning frequency of each circuit has the desired proportion to the operating frequency, for instance, to the carrier frequency. The method according to the invention, therefore, shall serve in general, to insure a definite reactance curve, whereby it is at first immaterial whether the reactance elements serve for determining the transmission ratio, or for influencing the apparent resistance or impedance.

The idea of the invention will now be elucidated especially in connection with the course of damping and with reference to the examples of construction shown herein.

Fig. 1 shows a damping curve of a band filter;

Fig. 2 is a circuit diagram of a bridge filter tuned by a variable capacitance;

Fig. 2a is a circuit diagram of another bridge filter tuned by a variable inductance; and Fig. 3 is a circuit diagram of a still further type of bridge filter tuned by inductance.

Fig. 1 shows a damping curve D as function of the frequency $f$ of a selection means revealing the character of a band filter. When defining a frequency $f_0$ as trough center of the filter, and its widths as $2\Delta f$, then the limits of the passage lie, for instance, at the frequencies $f_1 = f_0 - \Delta f$, and $f_2 = f_0 + \Delta f$. The problem now to be solved is so to tune the individual resonance circuits of such a selection means with a generator whose frequency is for instance $f_0$, that the limits of the range of the passage lie in fact at the given frequencies.

Figures 2 and 2a shows an example of such a selection means in the form of a bridge filter as proposed for instance by A. Jaumann United States Patent #1,882,631. The branches of this filter are divided in two parts which contain the reactances $L_1$, $C_1$ on the one side and $L_2$, $C_2$ on the other side. The resonance frequencies of these oscillatory circuits do not lie at the frequency $f_0$ but at the frequencies $f_1$ and $f_2$, respectively. In accordance with the invention after dividing up the filter, the individual oscillatory circuits are so varied by switching-in or switching-off of a reactance part, that after this adding, resonance with the desired operating frequency is established eventually following subsequent tuning of the reactance element. If, for instance, in the branch I, a condenser $C_n$ is inserted in series to the condenser $C_1$, and if the circuit I has the desired frequency $f_1$, then owing to this decrease of the capacity $C_1$ the resonance frequency is displaced upwards by a value $\Delta f$, so that the circuit is in fact tuned to the existing frequency if its reactances $L_1$ and $C_1$ previously revealed the desired values.

By varying the reactances, the largest deviation can now be adjusted to in case of the detuning, and the branch can be corrected in a simple manner. As a subsequent tuning measure, a small variable condenser $C_d$ may be resorted to and connected in parallel to $C_1$, or a tap $a$ of the coil $L_1$ may be used and which can be short-circuited. It is also possible to make connection to a tap, or to connect turns in the same or opposite sense. In accordance with the method of the invention, the additional reactance element $C_n$ is removed following the completion of the tuning, so that now the tuning frequency of the circuit has the desired predetermined proportion to the operating frequency, because due to the series connection of $C_n$ to $C_1$, the desired resonant frequency $f_1$ is displaced by a value $\Delta f$ to $f_0$, and as for the operation, the desired frequency has to exist.

No particular demands on the normal condenser $C_n$ are hereby necessary, since it is very large in comparison with $C_1$. The time constant of the reactance element to be added needs not be especially large. For the tuning of the circuit 2, corresponding measures can be resorted to, while simply bearing in mind that the frequency is to be reduced from $f_2$ to $f_0$ through additional reactance elements.

The present idea of the invention is in no way limited to the use of condensers as additional reactance element, and in place thereof also inductances may be employed as shown by $L_n$ in Fig. 2a. Furthermore, it is not necessary that the selection means are band filters of the bridge type, but instead any other filter, such as cross elements, branch filters according to Campbell or coupled oscillatory circuits or the like may be matched or tested in this manner.

The idea of the invention can be applied with particular advantage to such filters whose individual circuits consist of a multiplicity of reactances, since in this case the matching of the completed branch is practically impossible, for instance, in case of line measurements.

Figure 3 may serve as a simple example of such a complicated filter, and shows a bridge filter having at the one side two series resonance circuits placed in parallel thereto, and having at the other side one such circuit. When testing such filters, at first a preliminary matching by the switching of the inductances or capacitances is carried out as mentioned above in connection with Fig. 2 in order to bring two equivalent reactances of different oscillation circuits into a certain ratio relative to each other in accordance with a further feature of the invention, since these inductances or capacitances must have a certain ratio relative each other. If the inductances $L_1$ and $L_2$ are in the parallel circuit, and if $L_3$ is the inductance of the other circuit, then the ratio between $L_1$ or $L_2$ to $L_3$ is approximately 1 : 2, and the deviation from this ratio is a certain measure for the factor of the damping course of the filter for example, if all the branch containing the inductance $L_1$ is balanced. If now, inductance $L_1$ be replaced by inductance $L_2$, then for producing the resonance $L_2$ can be made without difficulty equal to $L_1$ by cutting turns in or out. Now, $L_1$ and $L_2$ shall have a ratio relative to $L_3$ of approximately 1 : 2. In order to obtain this ratio instead of $L_3$, the two equivalent inductances $L_1$ and $L_2$ are connected in parallel and this branch is balanced. If now the two parallelly connected inductances $L_1$ and $L_2$ be replaced by the inductance $L_3$, then this is at resonance equal to $2L_1$. It is also obvious that this procedure is suitable for bringing equivalent reactances of different branches into a desired ratio relative to each other.

The present method is not limited in its application to the tuning and testing of selection means at the place of reception, or in the train of the line, or at intermediate amplifiers, but may also be readily used in case of tube generators.

What is claimed is:

1. The method of selective tuning of a band-pass filter of an oscillatory circuit to filter out undesired transmission signals with means to bring the signal ratio and the impedance of the tuning means into resonance with a desired frequency to be transmitted, including the steps of applying current to said band-pass filter which has a frequency equal to its mid-band, said band-pass filter having a plurality of resonance branch circuits that determine the frequency band passed by said filter, inserting a reactance element in at least one of said resonance branch circuits, tuning to resonance the branch circuit which has the inserted reactance element at a frequency of the applied current so that upon removal of said inserted reactance element the branch circuit affected thereby is tuned to the proper frequency ratio of signal desired to be transmitted.

2. The method of selective tuning of a band-pass filter of an oscillatory circuit to filter out undesired transmission signals with means to bring the signal ratio and the impedance of the tuning means into resonance with a desired frequency to be transmitted, including the steps of applying current to said band-pass filter which has a frequency equal to its mid-band, said band-pass filter having a plurality of resonance branch circuits that determine the frequency band passed by said filter, switching a bridge circuit filter reactive element in at least one of said resonant branch circuits, tuning to resonance said branch circuit which has the bridge circuit filter reactance element at a frequency of the applied current so that upon removal of said bridge circuit filter reactance element the branch circuit affected thereby is tuned to the proper frequency ratio of the signal desired to be transmitted.

3. The method of selective tuning of a band-pass filter of an oscillatory circuit to filter out undesired transmission signals with means to bring the signal ratio and the impedance of the tuning means into resonance with a desired frequency to be transmitted, including the steps of applying current to said band-pass filter which has a frequency equal to its mid-band, said band-pass filter having a plurality of resonance branch circuits that determine the frequency band passed by said filter, inserting a bridge circuit filter capacitive unit in at least one of said resonant branch circuits, tuning to resonance the branch circuit which has the inserted filter capacitive unit at a frequency of the applied current, so that upon removal of said inserted filter capacitive unit the branch circuit affected thereby is tuned to the proper frequency ratio of the signal desired to be transmitted.

4. The method of selective tuning of a band-pass filter of an oscillatory circuit to filter out undesired transmission signals with means to bring the signal ratio and the impedance of the tuning means into resonance with a desired frequency to be transmitted, including the steps of applying current to said band-pass filter which has a frequency equal to its mid-band, said band-pass filter having a plurality of resonance branch circuits that determine the frequency band passed by said filter, inserting a bridge circuit filter inductive unit in at least one of said resonant branch circuits, tuning to resonance the branch circuit which has the inserted filter inductive unit at a frequency of the applied current, so that upon removal of said inserted filter inductive unit the branch circuit affected thereby is tuned to the proper frequency ratio of the signal desired to be transmitted.

KARL HEINRICH KRAMBEER.